(12) United States Patent
Brake

(10) Patent No.: US 7,092,022 B1
(45) Date of Patent: Aug. 15, 2006

(54) DOWNLOAD OF IMAGES FROM AN IMAGE CAPTURING DEVICE TO A TELEVISION

(75) Inventor: Wilfred Francis Brake, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 638 days.

(21) Appl. No.: 10/131,635

(22) Filed: Apr. 24, 2002

(51) Int. Cl.
 *H04N 5/222* (2006.01)
 *H04N 5/225* (2006.01)

(52) U.S. Cl. .................. 348/333.01; 348/373

(58) Field of Classification Search ........... 348/207.99, 348/207.1, 211.99, 211.1, 211.2, 211.3, 211.4, 348/333.01, 333.06, 333.07, 372–373, 375–376; 725/133, 141, 153
See application file for complete search history.

(56) References Cited

U.S. PATENT DOCUMENTS

| | | | | |
|---|---|---|---|---|
| 6,151,067 A * | 11/2000 | Suemoto et al. | ....... | 348/207.99 |
| 6,167,469 A | 12/2000 | Safai et al. | ..................... | 710/62 |
| 6,181,883 B1 | 1/2001 | Oswal | ........................ | 396/429 |
| 6,222,646 B1 | 4/2001 | Maurinus et al. | ........... | 358/440 |
| 6,529,233 B1 * | 3/2003 | Allen | ...................... | 348/211.2 |
| 2003/0011680 A1 * | 1/2003 | Tanaka et al. | ........... | 348/207.1 |
| 2003/0063215 A1 * | 4/2003 | Tsuji | .......................... | 348/375 |
| 2003/0117499 A1 * | 6/2003 | Bianchi et al. | .......... | 348/211.2 |
| 2004/0070681 A1 * | 4/2004 | Battles et al. | .......... | 348/333.01 |
| 2004/0105024 A1 * | 6/2004 | Takahashi | .............. | 348/333.01 |
| 2005/0046727 A1 * | 3/2005 | Nozaki et al. | ......... | 348/333.07 |
| 2005/0104972 A1 * | 5/2005 | Jin-Fu et al. | ............ | 348/211.1 |

FOREIGN PATENT DOCUMENTS

| | | |
|---|---|---|
| EP | 0844781 | 5/1998 |
| WO | WO 99/24907 | 5/1999 |
| WO | WO 00/19294 | 4/2000 |
| WO | WO 00/48384 | 8/2000 |
| WO | WO 00/50955 | 8/2000 |
| WO | WO 01/84842 | 11/2001 |

\* cited by examiner

*Primary Examiner*—Tuan Ho
*Assistant Examiner*—Brian Jelinek

(57) ABSTRACT

An image viewing system includes at least one television and a docking station capable of communicating with an image capturing device and a television. The docking station controls operation of the television and receives one or more electronic images from the image capturing device. The docking station transmits the electronic images to the television for display and viewing. Alternatively, the image capturing device may directly control the television and may directly transmit electronic images to the television for display and viewing.

12 Claims, 5 Drawing Sheets

DOWNLOAD OF IMAGES FROM AN IMAGE CAPTURING DEVICE TO A TELEVISION

FIELD OF THE INVENTION

The present invention relates generally to an image viewing system, and more particularly to an image viewing system for viewing captured electronic images.

BACKGROUND OF THE INVENTION

Image capturing devices, such as still and video cameras, are typically used to capture scenes, persons, settings, occasions, etc. One type of image capturing device is a digital image capturing device that electronically captures and stores images. The digital image capturing device offers several advantages, such as no need for film, the ability to capture high resolution images and images of varying resolutions, and the ability to download, print, re-size, and re-transmit captured images.

A digital image capturing device may accumulate captured images up to the capacity of its memory. The memory may be an internal memory, a removable memory, or both. In real life, users typically accumulate as many images as a memory can hold. A user may then download to a computer or printer and may print the images and/or transmit them to others.

Another advantage of a digital image capturing device is the ability to review captured images while they are stored in the image capturing device. The user may instantly review a captured image to see if it is satisfactory. If the captured image is not satisfactory, the image may be erased. Subsequently, a new image may be captured.

The prior art image viewing approach is usually the conduction of an image review on an onboard display, such as an LCD screen. However, there are several drawbacks to this approach. The onboard display must be small. Therefore, it is hard to see detail on the onboard screen. In addition, the LCD display is hard to view in moderate to bright light. Furthermore, only one person can view an image at a time.

Another prior art approach to viewing captured images is to print them out in order to review them. However, this has its own drawbacks. Printing out images is slow, and the user must first transfer the images out of the image capturing device. The transfer requires connection to a computer or printer. In addition, the printing may be expensive, as the user may consume expensive photo paper. Consequently, the user may have to print images and then discard them.

Therefore, there remains a need in the art for improvements in image viewing systems for viewing captured electronic images.

SUMMARY OF THE INVENTION

An image viewing system comprises at least one television and a docking station capable of communicating with an image capturing device and a television. The docking station controls operation of the television and receives one or more electronic images from the image capturing device. The docking station transmits the electronic images to the television for display and viewing. Alternatively, the image capturing device may directly control the television and may directly transmit electronic images to the television for display and viewing.

DETAILED DESCRIPTION

Figure 1:
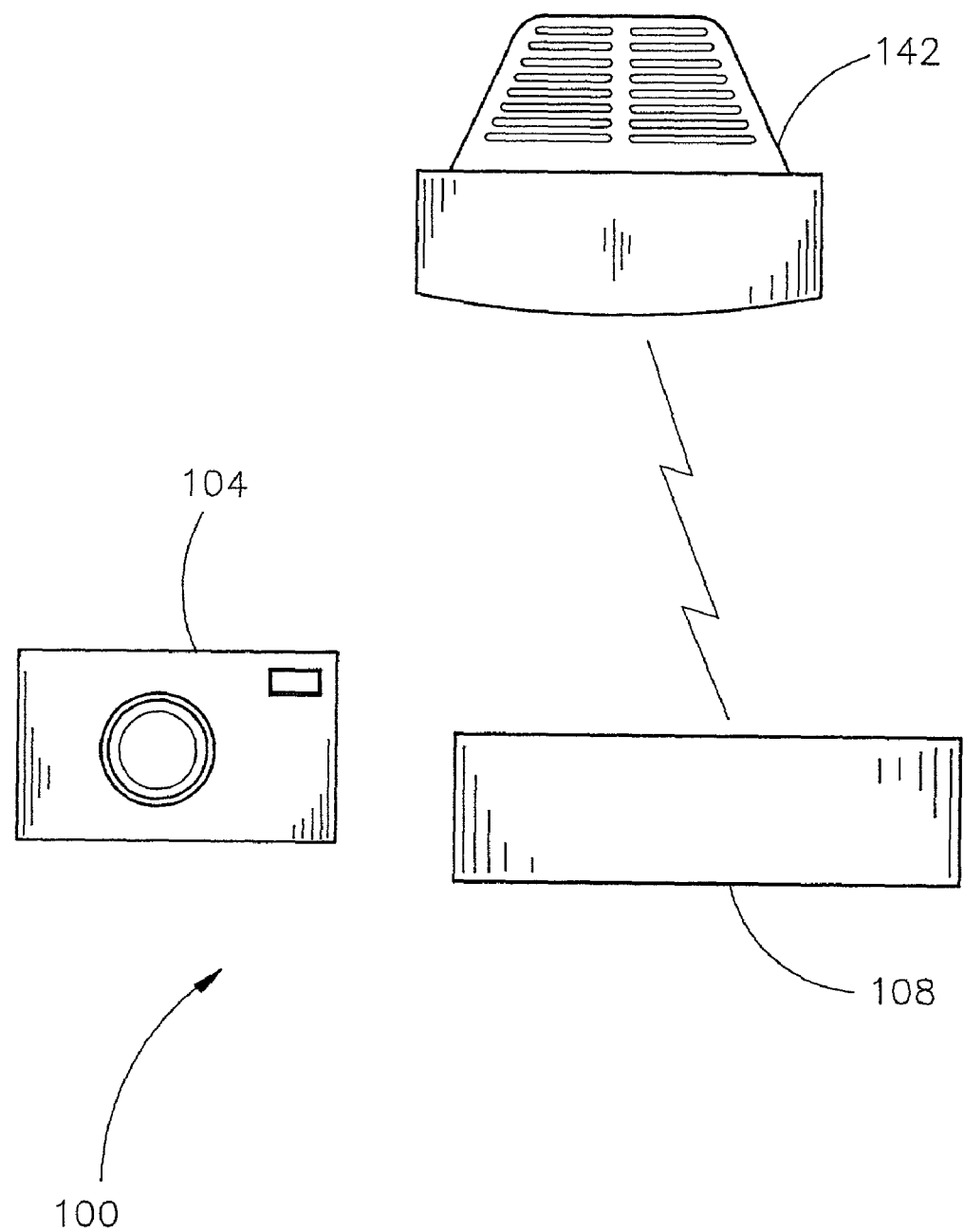
FIG. 1 shows an image viewing system according to one embodiment of the invention.

FIG. 1 shows an image viewing system 100 according to one embodiment of the invention. The image viewing system 100 may include an image capturing device 104, a docking station 108, and a television 142. The docking station 108 may be used in order to view captured electronic images on the television 142. More than one television 142 may receive and display the electronic images. In addition, the docking station 108 may perform traditional docking station functions, such as downloading images to a computer or printer, etc.

The image capturing device 104 may be any manner of digital image capturing device, such as a digital still camera, a digital video camera, a handheld scanner, etc. The image capturing device 104, when docked into the docking station 108, may cause the docking station 108 to perform several actions. The docking station 108 may turn on the television 142, may tune the television 142 (such as to channel 3, for example), may set the volume level of the television 142, may download one or more electronic images from the image capturing device 104 for display on the television 142, may convert the electronic images into a television transmission format, and may transmit images to the television 142. The television 142 displays the received electronic images.

The television power on, volume, and tune commands may be sent to the television 142 via infrared (IR) signals, as in a remote control. Most modern televisions are controllable by infrared signals. Alternatively, the television 142 may be a component of an entertainment center that controls the television 142. Therefore, the television commands may be sent to the entertainment center. The images may be transmitted to the television 142 via radio frequency (RF) waves modulated according to a television transmission format.

In an alternative embodiment, the image capturing device 104, the docking station 108, and event the television 142 (or an entertainment center including the television 142) may communicate using the BLUE TOOTH RF communication protocol.

The docking station 108 may initiate an image transfer when the image capturing device 104 is docked. Alternatively, a user may initiate the transfer by pressing an appropriate button on the image capturing device 104 or by pressing an appropriate button on the docking station 108.

The docking station 108 may automatically perform a slideshow function, wherein the docking station 108 periodically sends a new image to the television 142. Alternatively, the user may control the sending of new images, such as by pressing a previous or next button on the image capturing device 104 or on the docking station 108. The docking station 108 may be a custom device just for interacting with the television 142. Alternatively, the docking station 108 may additionally perform other traditional docking station functions, such as downloading images to a computer or printer, etc.

Figure 2:
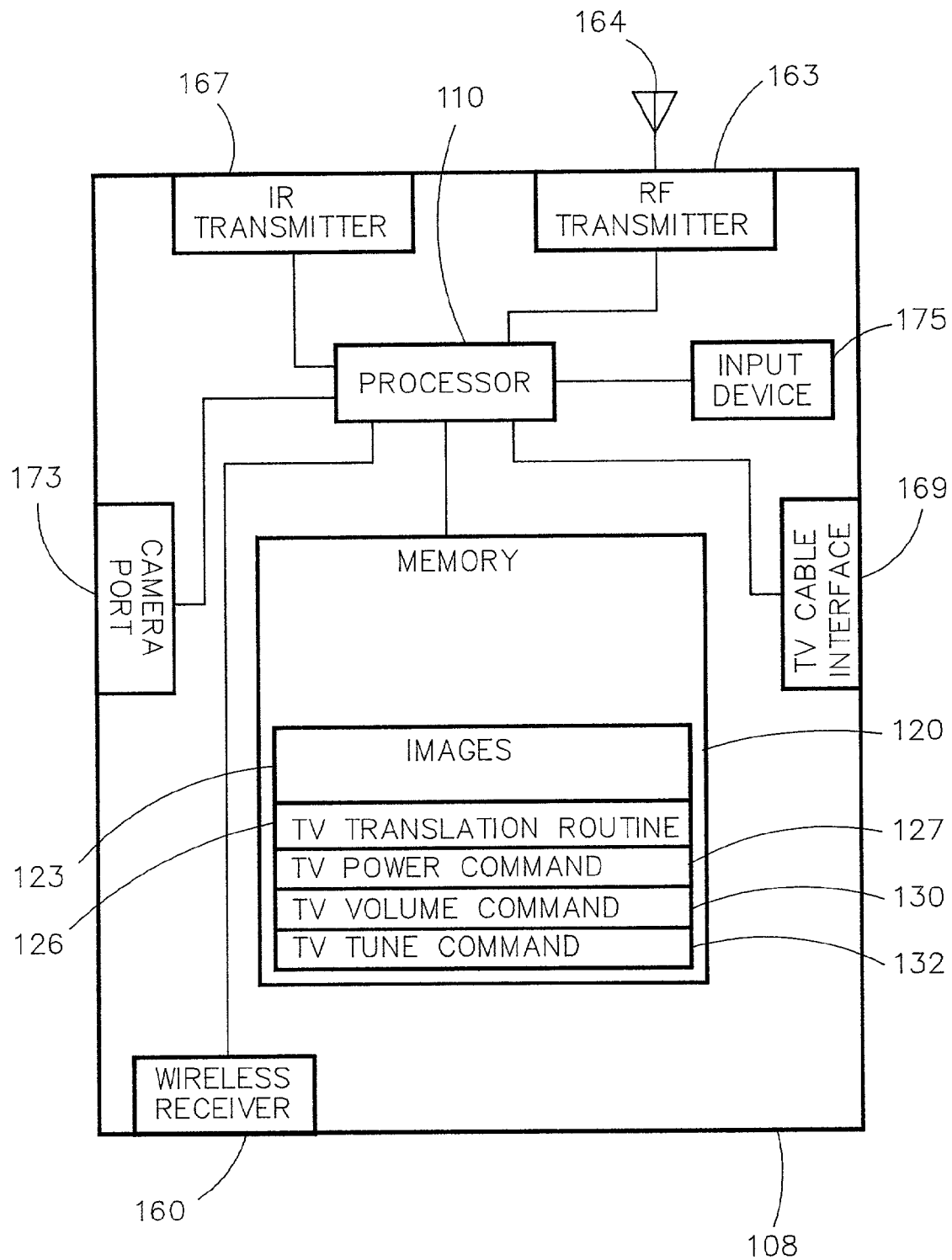
FIG. 2 is a schematic of a docking station according to one embodiment of the invention.

FIG. 2 is a schematic of a docking station 108 according to one embodiment of the invention. The docking station 108 may include a processor 110, a memory 120, a wireless receiver 160, an RF transmitter 163 and corresponding antenna 164, an IR transmitter 167, a television cable interface 169, a camera port 173, and at least one input device 175.

The processor 110 may be any type of general purpose processor. The processor 110 executes a control routine contained in the memory 120. In addition, the processor 110 receives inputs and transmits electronic images to at least one television 142 for viewing.

The memory 120 may be any type of digital memory. The memory may store images 123, a television translation routine 126, a television power command 127, a television volume command 130, and a television tune command 132. In addition, the memory 120 may store software or firmware to be executed by the processor 110.

The images 123 may be any manner and number of stored images, including digital still images, digital video image frames or digital video clips, scanned images, etc.

The television translation routine 126 may be any manner of translation routine capable of converting an image or images into television-ready display frames. It should be understood that alternatively the images 123 and the television translation routine 126 may be located within the image capturing device 104, as will be discussed below in conjunction with FIG. 4.

The television power command 127 may be an IR power command capable of being transmitted through the IR transmitter 167 to the television 142 in order to turn the television 142 on and off. The television 142 may be turned on before an image viewing session is commenced, and may optionally be turned off when the image viewing session is over.

The television tune command 132 may likewise be an IR command which may be sent through the IR transmitter 167. The television tune command sets the television 142 to a predetermined television channel. The channel may be a fixed television channel, such as for example, television channel 3.

The television volume command 130 may set the volume level of the television 142 to a predetermined volume level. The volume level may be a volume level appropriate for image viewing. In addition, the television volume command 130 may include two volume levels, with a first volume level for still image viewing and a second volume level for viewing video clips.

The wireless receiver 160 may be any wireless receiver capable of receiving image data downloads from the image capturing device 104 via a wireless transmission. The wireless transmission may include RF and IR transmission.

In one embodiment, the image capturing device 104 may include a broadcast mode wherein the image capturing device 104 broadcasts images whenever powered up. Therefore, the docking station 108 may power up and start an image transfer whenever the docking station 108 receives images from the image capturing device 104 via the wireless receiver 160. Alternatively, the image capturing device 104 may include a wireless transmit mode that may be initiated by the user, such as through a button press.

The RF transmitter 163 may be any manner of RF transmitter capable of generating a modulated television signal and capable of transmitting image data to the television 142 for display.

The IR transmitter 167 may be any manner of IR transmitter capable of sending IR commands to the television 142. The docking station 108 may use the IR transmitter 167 in order to control operations of the television 142, such as turning the television 142 on and off, selecting a proper channel, setting the volume of the television 142, etc.

The television cable interface 169 may be an electronic interface capable of connecting to any type of television cable. The cable may be an RCA cable, stereo cable, coaxial cable, etc. Therefore, the image downloading may occur over a television cable connected to the television 142. The television cable interface 169 is an optional interface for sending the images to the television over a manner of cable connected to a television input.

In one embodiment, the camera port 173 may be a cable port capable of accepting any type of cable connection for cable communication. The camera port 173 may accept a universal serial bus (USB) cable, for example, for downloading images from the image capturing device 104. The camera port 173 may be an optional component, and may be included in addition to the wireless receiver 160.

Alternatively, the camera port 173 may be some manner of connector that fits into a memory card slot in the image capturing device or may be any other manner of cable. For example, the camera port 173 may include a connector that plugs directly into the image capturing device 104 when the image capturing device 104 is inserted into a receptacle in the docking station 108.

In another alternative embodiment, the camera port 173 may be a wireless communication port, such as an IR or RF communication device. For example, the camera port 173 may communicate using the BLUE TOOTH RF communication protocol. Therefore, images may be wirelessly received from the image capturing device 104.

The at least one input device 175 may be any type of input device, such as button, switch, menu item, etc. The user of the docking station 108 may use the at least one input device 175 to control an image viewing session. This may include using the at least one input device 175 for initiating an image viewing session, selecting an image or images to be downloaded to the television 142, and selecting a next image to be displayed.

Figure 3:
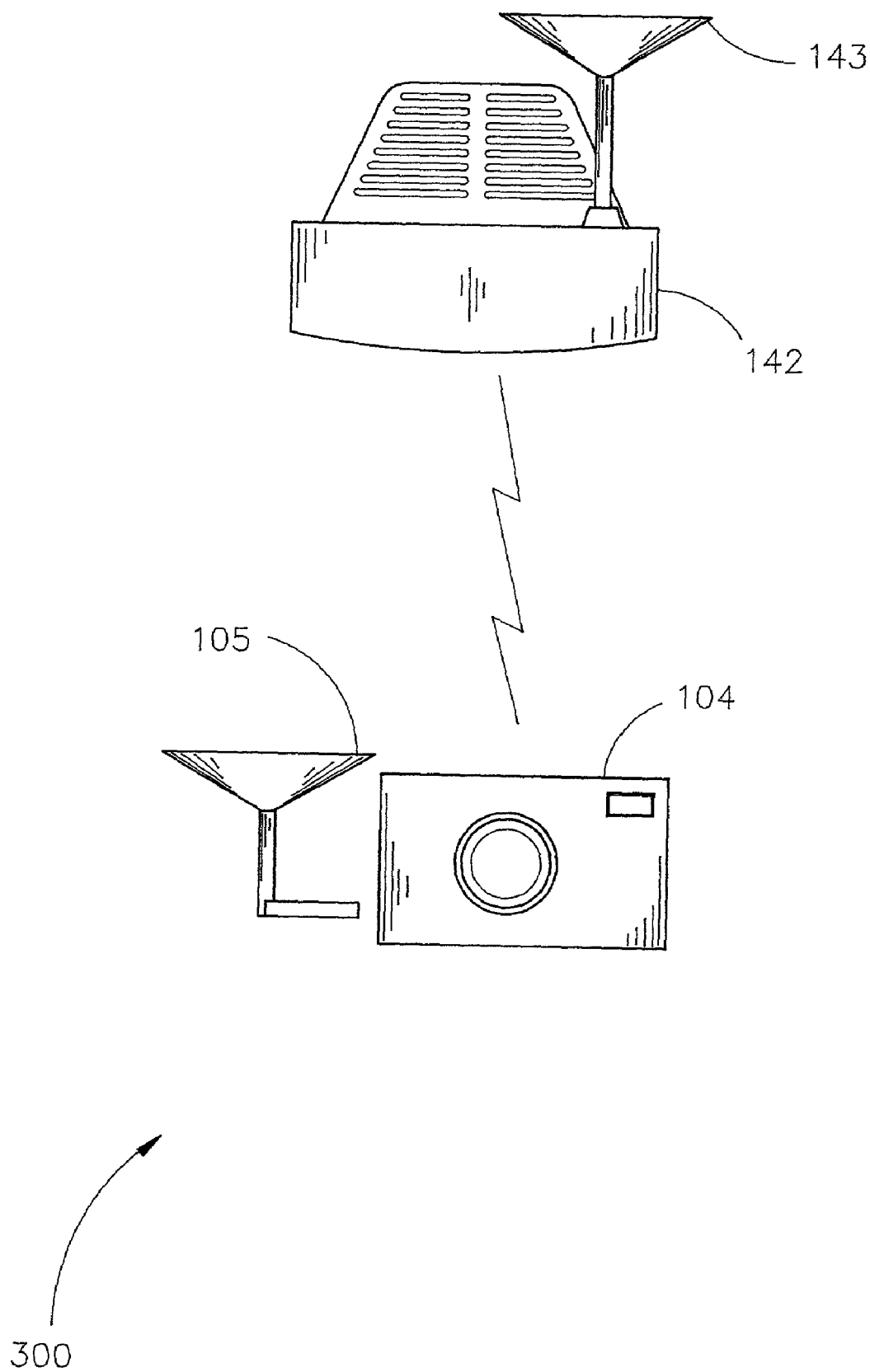
FIG. 3 shows an image viewing system according to another embodiment of the invention.

FIG. 3 shows an image viewing system 300 according to another embodiment of the invention. The image viewing system 300 includes an image capturing device 104 and corresponding antenna 105 and at least one television 142 and corresponding antenna 143. In this embodiment, the image capturing device 104 is capable of conducting IR and RF transmissions, and is capable of directly transmitting captured images to the television 142 for viewing.

In this embodiment, the image capturing device 104 may turn on the television 142, may tune the television 142 (such as to channel 3), may convert the images into a television transmission format, and may transmit the image (or series of images) to the television 142. Alternatively, the image capturing device 104 may send a video clip to the television 142. The television 142 displays images as they are received.

When the image capturing device 104 is trying to turn on the television 142 in order to send images, the user may initiate the television power-up and may check that the television is powered-on. However, since the image capturing device 104 is capable of capturing an image, in one embodiment the image capturing device 104 may be employed to monitor the power-up, etc. of the television 142. For example, the user may point the image capturing device 104 at the television (the image capturing device 104 may or may not be docked in the docking station 108), and the image capturing device 104 may try several IR power-on commands for different television brands. The image capturing device 104 may detect whether an image change has occurred in order to ensure that the television 142 actually powered-on. In this manner, the image capturing device 104 may be capable of self-programming in order to accommodate the television 142. When a correct power-on command has been found, the image capturing device 104 may determine the approximate television brand/model, and may therefore use analogous television commands to set the channel and volume.

In this embodiment, the image capturing device 104 initiates the transfer. For example, the user may initiate the transfer by a button press on the image capturing device 104. Alternatively, the image capturing device 104 may automatically initiate an image viewing session if the image capturing device 104 is brought into proximity of the television 142. The image capturing device 104 may do this by intermittently or continuously broadcasting the IR television commands and the image or images. Consequently, when the image capturing device 104 is brought into proximity of the television 142 by the user, the television 142 may be automatically configured and may start displaying captured images. Such a feature may be disabled through use of a mechanical input device or menu item.

In addition, the image capturing device 104 may automatically perform a slideshow, wherein the image capturing device 104 periodically sends a new image or image frame to the television 142. Alternatively, the user may control the sending of new images, such as by pressing a previous or next button on the image capturing device 104.

Figure 4:
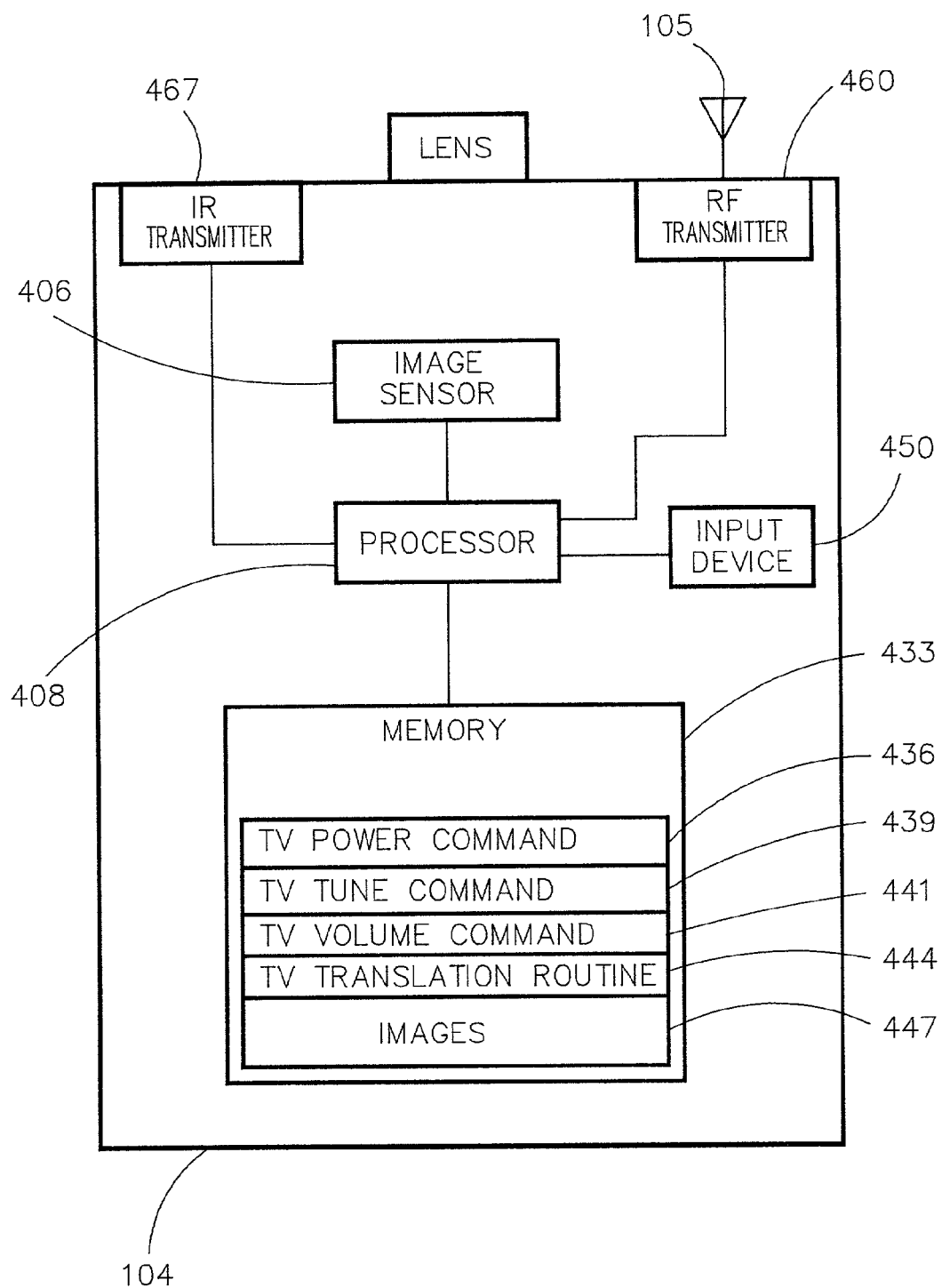
FIG. 4 is a schematic of an image capturing device according to one embodiment of the invention.

FIG. 4 is a schematic of an image capturing device 104 according to one embodiment of the invention. The image capturing device 104 may include an electronic image sensor 406, a processor 408, a memory 433, at least one input device 450, an RF transmitter 460 and accompanying antenna 105, and an IR transmitter 467.

The image sensor 406 may be any type of electronic image sensor capable of capturing images, such as a charge coupled device (CCD) sensor or a complementary metal oxide semiconductor (CMOS) sensor, for example. The image sensor 406 may capture still images or video.

The processor 408 may be any type of general purpose processor. The processor 408 executes a control routine contained in the memory 433. In addition, the processor 408 receives inputs and transmits electronic images to at least one television 142 for viewing.

The memory 433 may be any type of digital memory. The memory 433 may store a television power command 436, a television tune command 439, a television volume command 441, a television translation routine 444, and images 447, as previously discussed. In addition, the memory 433 may store software or firmware to be executed by the processor 408.

The television power command 436 may be an infrared power command capable of being transmitted through the IR transmitter 467 to the television 142 in order to turn the television 142 on and off. The television 142 may be turned on before an image viewing session is commenced, and may optionally be turned off when the image viewing session is over.

The television tune command 439 may likewise be an IR command, which may be sent through the IR transmitter 467. The television tune command 439 sets the television 142 to a predetermined television channel. The channel may be a fixed television channel, such as for example, television channel 3.

The television volume command 441 may likewise be an IR command and may set the volume level of the television 142 to a predetermined volume level. The volume level may be a volume level appropriate for image viewing. In addition, the television volume command 441 may include two volume levels, with a first volume level for still image viewing and a second volume level for viewing video clips.

The television translation routine 444 may be any manner of translation routine capable of converting an image or images into television-ready display frames.

The images 447 may be any manner and number of stored images, including digital still images, digital video image frames or digital video clips, scanned images, etc.

The at least one input device 450 may be any type of input device, such as button, switch, menu item, etc. The user of the image capturing device 104 may use the at least one input device 450 to control an image viewing session. This may include using the at least one input device 450 for initiating an image viewing session, selecting an image or images to be downloaded to the television 142, and selecting a next image to be displayed.

The RF transmitter 460 may be any manner of RF transmitter capable of generating a modulated television signal and capable of transmitting image data to the television 142 for display.

The IR transmitter 467 may be any manner of IR transmitter capable of sending IR commands to the television 142. The image capturing device 104 may use the IR transmitter 467 in order to control operations of the television 142, such as turning the television 142 on and off, selecting a proper channel, setting the volume of the television 142, etc.

Figure 5:
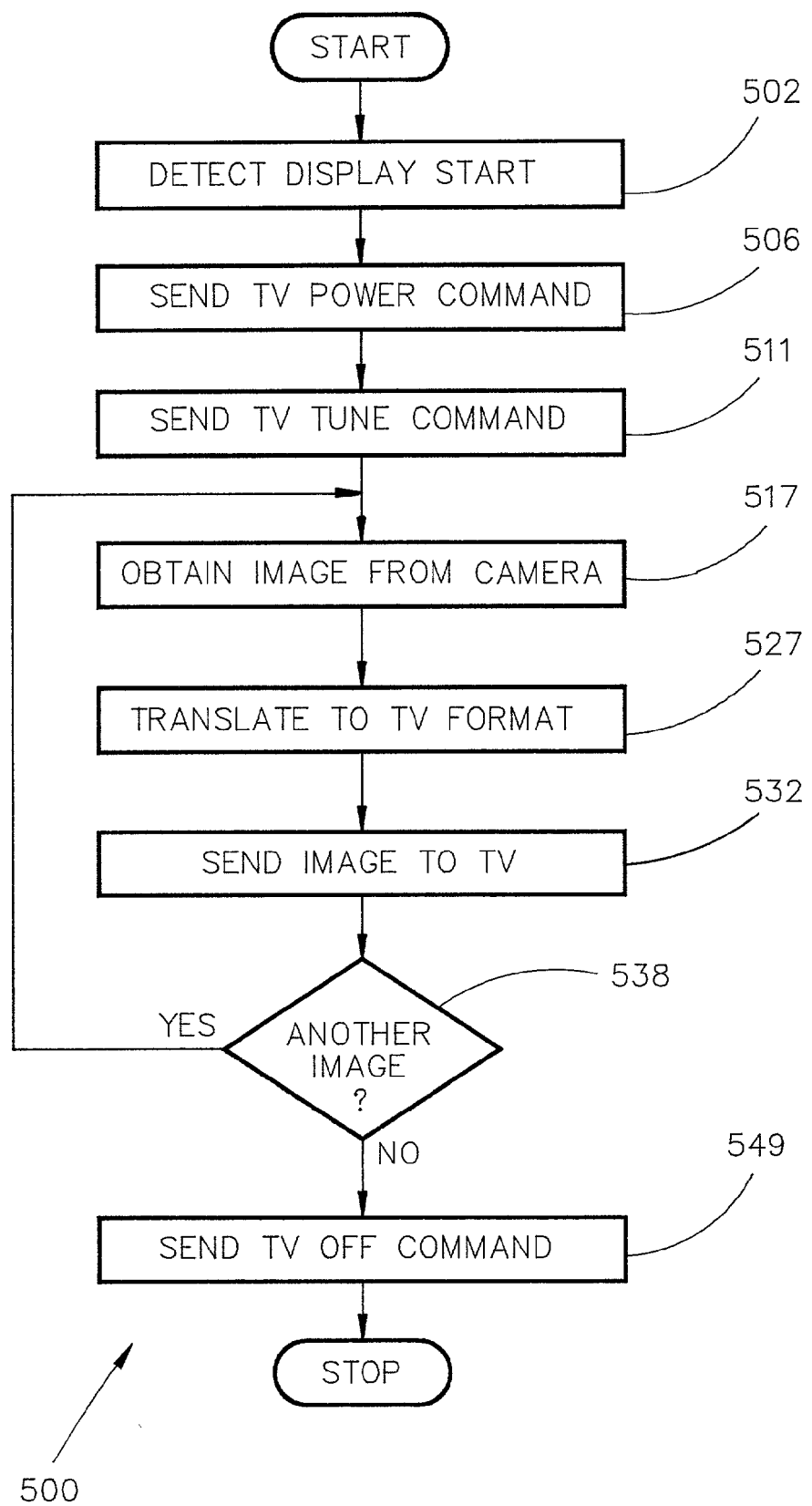
FIG. 5 is a flowchart of an image viewing method according to yet another embodiment of the invention.

FIG. 5 is a flowchart 500 of an image viewing method according to yet another embodiment of the invention. In step 502, a display start is detected. This may be, for example, a user press of an image review button or switch. Alternatively, it may be a docking of the image capturing device 104 in the docking station 108 or it may be the proximity of the television 142. Any of these operations may trigger an image viewing session.

In step 506, a television power on command is sent to the television 142. This may be from either the image capturing device 104 or from the docking station 108 depending on whether the docking station 108 is used. The television power on command turns on the power to the television 142.

In step 511, a television tune command is set to the television 142 from either the image capturing device 104 or the docking station 108, as previously discussed. The television tune command sets the television 142 to a predetermined television channel. The set television tune command in this step may additionally include sending a set volume command to the television 142.

In step 517, if the docking station 108 is being used, one or more images are obtained from an image capturing device 104. The images may be digital still images, may be digital scanned images, may be video clips or video frames, etc. The images may be downloaded from an image capturing device to the docking station 108, such as shown in FIG. 1. This step is not necessary if the docking station 108 is not used.

In step 527, the images are translated to a television format for transmission as a television signal.

In step 532, one or more images are transmitted to the television 142. This may be via RF waves according to a television transmission format, or via a television cable connection.

In step 538, the method determines whether there is another image to be transmitted. If another image video clip or image frame is to be transmitted, the method loops back to step 517; otherwise the method exits. This step allows an iterative display of images, such as in a slideshow, or allows a user to use a previous or next input to cycle through the captured images.

In step 549, after conclusion of image viewing, the docking station 108 or the image capturing device 104 may optionally send a TV power off command to the television.

The image viewing system according to the invention provides several benefits. A user can transmit images to and view them on any size of television 142. The images are therefore larger than on an onboard image capturing device display, and as a result the user can see all details of an image. In addition, use of a television 142 for image viewing is quick and may not require any cable connection. Furthermore, a single image capturing device 104 may transmit images to multiple televisions 142. Moreover, an image capturing device 104 or docking station 108 according to the invention can automatically start transmitting images in the presence of the television 142 without need for user action.

I claim:

1. A docking station adapted to download electronic images from an image capturing device and adapted to display said electronic images on at least one television, comprising:
   a television command transmission device capable of sending television control commands to said at least one television;
   an image data reception device capable of receiving an electronic image from said image capturing device;
   an image data transmission device capable of transmitting said electronic image to said at least one television;
   a memory storing a television translation routine, a television power command, and a television tune command; and
   a processor communicating with said television command transmission device, said image data reception device, said image data transmission device, and said memory, with said processor downloading said electronic image using said image data reception device, transmitting a television power command to said at least one television using said television command transmission device, transmitting a television tune command to said at least one television using said television command transmission device, translating said electronic image using said television translation routine to create a translated image, and transmitting said translated image to said at least one television using said image data transmission device.

2. The docking station of claim 1, wherein said television command transmission device comprises an infrared (IR) transmitter.

3. The docking station of claim 1, wherein said image data reception device comprises a camera port capable of interfacing with said image capturing device.

4. The docking station of claim 1, wherein said image data reception device comprises an RF receiver capable of receiving RF transmissions from said image capturing device.

5. The docking station of claim 1, wherein said image data reception device comprises an IR receiver capable of receiving IR transmissions from said image capturing device.

6. The docking station of claim 1, wherein said image data transmission device comprises a television cable interface capable of interfacing with a television cable.

7. The docking station of claim 1, wherein said image data transmission device comprises an RF transmitter.

8. The docking station of claim 1, further comprising an input device capable of accepting a user input that initiates an image download to said at least one television.

9. The docking station of claim 1, wherein a downloading operation is initiated by said processor when said one or more images are received via said image data reception device.

10. The docking station of claim 1, wherein said memory further stores a television volume command.

11. The docking station of claim 1, wherein said memory further stores images to be transmitted to said at least one television.

12. An image viewing method for an image capturing device, comprising the steps of:
   transmitting a television power command from a docking station to at least one television, with said television power command being capable of powering on a receiving television;
   transmitting a television tune command from said docking station to said at least one television, with said television tune command being capable of tuning said receiving television to a predetermined television channel;
   translating an electronic image to a television transmission format to create a translated image;
   transmitting said translated image to said at least one television;
   pointing said image capturing device at said at least one television before the step of transmitting said television power command;
   detecting in said image capturing device whether said at least one television powered-up as a result of said television power command; and
   repeating the steps of transmitting said television power command and detecting whether said at least one television powered-up until said at least one television powers-up.

* * * * *